(12) United States Patent
Hedge et al.

(10) Patent No.: US 11,339,864 B2
(45) Date of Patent: May 24, 2022

(54) INTEGRATED GEAR AND TORSIONAL VIBRATION DAMPER ASSEMBLY

(71) Applicant: Parker-Hannifin Corporation, Cleveland, OH (US)

(72) Inventors: Jonathan S. Hedge, Memphis, TN (US); Ian M. George, Hastings (AU); Jeffrey D. King, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/761,326

(22) PCT Filed: Feb. 4, 2019

(86) PCT No.: PCT/US2019/016451
§ 371 (c)(1),
(2) Date: May 4, 2020

(87) PCT Pub. No.: WO2019/152903
PCT Pub. Date: Aug. 8, 2019

(65) Prior Publication Data
US 2021/0190193 A1    Jun. 24, 2021

Related U.S. Application Data

(60) Provisional application No. 62/625,595, filed on Feb. 2, 2018.

(51) Int. Cl.
*F16H 55/14* (2006.01)
*F16H 57/00* (2012.01)
*F16F 15/14* (2006.01)

(52) U.S. Cl.
CPC .......... *F16H 55/14* (2013.01); *F16F 15/145* (2013.01); *F16F 15/1428* (2013.01);
(Continued)

(58) Field of Classification Search
CPC .. F16H 55/14; F16H 55/1428; F16H 57/0006; F16H 2057/0012; F16H 55/18; F16F 15/1442; F16F 15/145; F16F 15/123
See application file for complete search history.

(56) References Cited

U.S. PATENT DOCUMENTS

| 2004/0134456 A1 | 7/2004 | Cholewczynski |
| 2011/0132116 A1* | 6/2011 | Simpson ................. F16H 55/30 74/411 |

(Continued)

FOREIGN PATENT DOCUMENTS

| DE | 4426529 A1 | 2/1996 |
| DE | 102004006602 A1 | 9/2005 |

(Continued)

OTHER PUBLICATIONS

EPO Machine Translation of WO 2017021632A1, Malley, Feb. 2017 (Year: 2017).*

(Continued)

*Primary Examiner* — Vinh Luong
(74) *Attorney, Agent, or Firm* — MacMillan, Sobanski & Todd, LLC

(57) ABSTRACT

An integrated gear and torsional vibration damper assembly (10, 20, 30, 30) includes a gear (11, 21, 31, 41) having a toothed portion (11a, 21a, 31a, 41a) and a torsional vibration damper (12, 22, 32, 42) supported on the gear (11, 21, 31, 41) for limited rotational and dampened movement relative to each other. The gear (11) may include a hub portion (11b), and the torsional vibration damper (12) may be supported on the hub portion (11b) of the gear (11). Alternatively, the gear (21) may include a hub portion (21b), an intermediate ring (23) may be supported on the hub portion (21b) of the gear (21), and the torsional vibration damper (22) may be supported on the intermediate ring (23). Alternatively, the gear (31) may include a toothed portion (Continued)

(31a) and a hub portion (31b) that extends radially inwardly from the toothed portion (31a) and has an opening (31c) extending therethrough, and the torsional vibration damper (32) may extend through the opening (31c). Alternatively, the gear (41) may include an inner circumferential surface that engages and supports an outer circumferential surface of the torsional vibration damper (41).

9 Claims, 10 Drawing Sheets

(52) U.S. Cl.
CPC ..... *F16F 15/1442* (2013.01); *F16H 57/0006* (2013.01); *F16H 2057/0012* (2013.01)

(56) References Cited

U.S. PATENT DOCUMENTS

| | | | |
|---|---|---|---|
| 2014/0013885 A1* | 1/2014 | Takekawa | F16H 57/0006 74/412 R |
| 2014/0228159 A1 | 8/2014 | He | |
| 2016/0138699 A1* | 5/2016 | Dell | F16F 15/12346 474/94 |
| 2017/0234419 A1* | 8/2017 | Manzoor | F16H 55/36 474/94 |
| 2020/0132126 A1* | 4/2020 | Hedge | F16H 55/17 |
| 2021/0231204 A1* | 7/2021 | Morio | F16H 55/14 |

FOREIGN PATENT DOCUMENTS

| | | | | |
|---|---|---|---|---|
| EP | 2693082 A1 | 2/2014 | | |
| JP | S61164855 U | 10/1986 | | |
| JP | 2004162801 A | 6/2004 | | |
| JP | 2015212555 A | 11/2015 | | |
| WO | 2006037426 A1 | 4/2006 | | |
| WO | 2009015633 A1 | 2/2009 | | |
| WO | WO 2017021632 A1 * | 2/2017 | ............. | F16F 15/14 |
| WO | WO 2018081673 A2 * | 5/2018 | ............. | B60K 17/28 |
| WO | WO 2021030909 A1 * | 2/2021 | ............... | F16D 3/00 |

OTHER PUBLICATIONS

International Search Report and Written Opinion, Application No. PCT/US2019/016451, dated May 8, 2019.

\* cited by examiner

INTEGRATED GEAR AND TORSIONAL VIBRATION DAMPER ASSEMBLY

CROSS-REFERENCE TO RELATED APPLICATIONS

This application claims the benefit of U.S. Provisional Application No. 62/625,595, filed Feb. 2, 2018, the disclosure of which is incorporated herein by reference.

BACKGROUND OF THE INVENTION

This invention relates in general to torsional vibration dampers that reduce the transmission of torque transients therethrough. In particular, this invention relates to an integrated gear and torsional vibration damper assembly that reduces the transmission of torque transients therethrough.

Reciprocating internal combustion engines and diesel engines are known to generate torsional vibrations, which are manifested as cyclical variations in the rotational speed of an output shaft that is driven by the engine. These torsional vibrations are primarily caused by the non-linear nature of the combustion events occurring within the engine, i.e., the periodic firing of the pistons. When one of the engine pistons fires, the resulting combustion event causes a relatively short, but relatively large magnitude, impulse force to be applied to an output shaft of the engine, which causes the output shaft to briefly accelerate in the rotational direction of such force. At the conclusion of this impulse force, the output shaft decelerates in the opposite rotational direction of such force. Thus, these cyclical variations in the rotational speed of the engine output shaft typically exhibit a generally sinusoidal pattern of alternating periods of acceleration and deceleration relative to an average engine speed.

A gear that is rotatably driven by an engine output shaft experiencing these torsional vibrations will frequently transfer these cyclically varying forces to other gears that mesh therewith. In some scenarios, such as when an engine is operating at or near idle speeds and is rotatably driving an unloaded gearbox (such as a transmission or a power take off), these torsional vibrations can result in the occurrence of a series of either single-sided or double-sided impacts between the interfacing teeth in a pair of meshing gears contained within the gearbox. These impacts can generate an undesirable audible noise, which is often referred to as a "neutral rattle" and which has been the subject of much attention in the power transmission industry for many years.

A torsional vibration damper is a mechanism that reduces the magnitude of torsional vibrations in a rotatably driven component. Generally speaking, such torsional vibration dampers utilize inertia to reduce the amount of the above-described rotational accelerations and decelerations transmitted by the engine output shaft. Thus, a torsional vibration damper can be used in a gear train to minimize the occurrence of the undesirable neutral rattle described above. It would be desirable to provide an integrated gear and torsional vibration damper assembly that reduces the transmission of torque transients therethrough.

SUMMARY OF THE INVENTION

This invention relates to an integrated gear and torsional vibration damper assembly that reduces the transmission of torque transients therethrough. The integrated gear and torsional vibration damper assembly includes a gear having a toothed portion and a torsional vibration damper supported on the gear for limited rotational and dampened movement relative to each other. In a first embodiment, the gear includes a hub portion, and the torsional vibration damper is supported on the hub portion of the gear. In a second embodiment, the gear includes a hub portion, an intermediate ring is supported on the hub portion of the gear, and the torsional vibration damper is supported on the intermediate ring. In a third embodiment, the gear includes a toothed portion and a hub portion that extends radially inwardly from the toothed portion and has an opening extending therethrough, and the torsional vibration damper extends through the opening. In a fourth embodiment, the gear includes an inner circumferential surface that engages and supports an outer circumferential surface of the torsional vibration damper.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
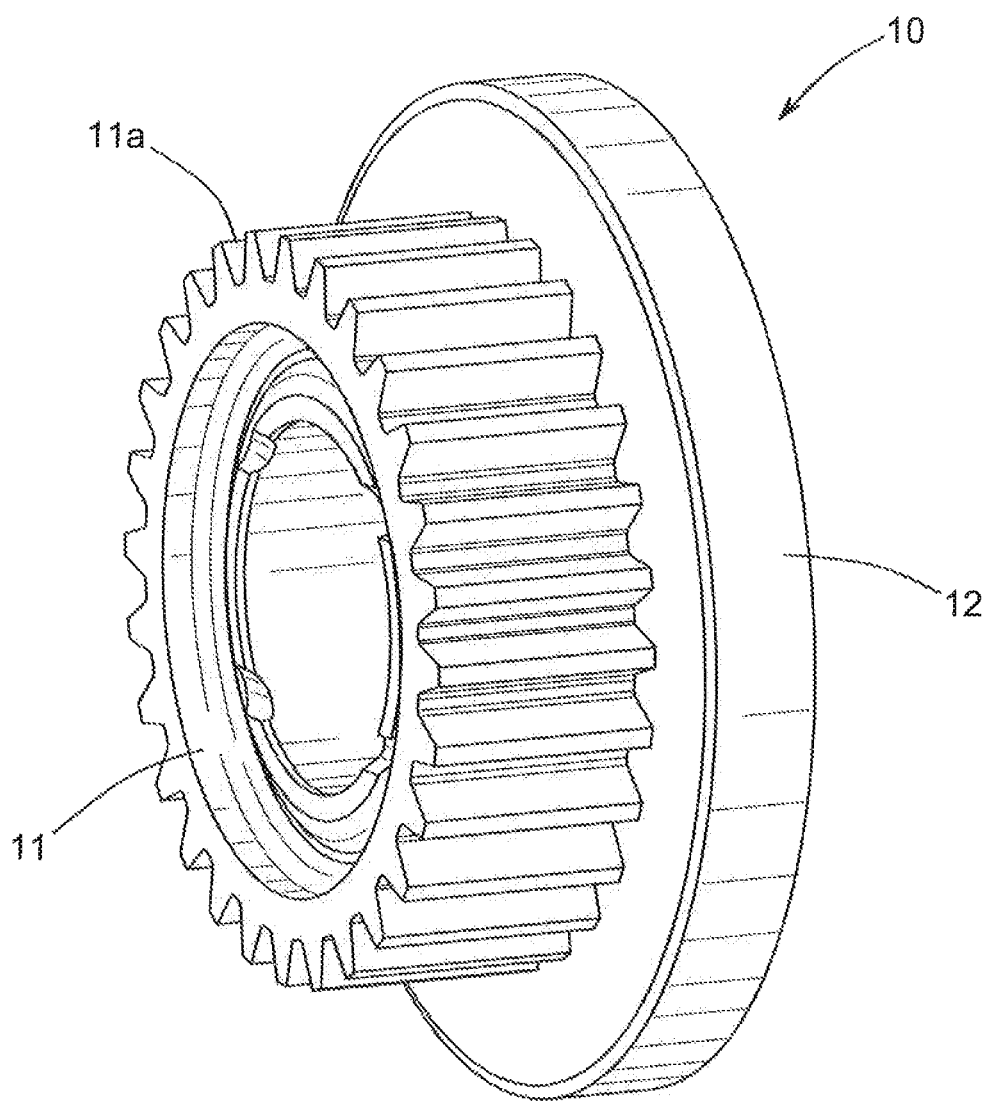
FIG. 1 is a perspective view of a first embodiment of an integrated gear and torsional vibration damper assembly in accordance with this invention.

Referring now to the drawings, there is illustrated in FIGS. 1 through 6 a first embodiment of an integrated gear and torsional vibration damper assembly, indicated generally at 10, in accordance with this invention. As shown therein, the first embodiment of the integrated gear and torsional vibration damper assembly 10 includes a gear 11 and a torsional vibration damper 12 that, as will be described below, are supported on one another for limited rotational and dampened movement relative to each other.

Figure 3:
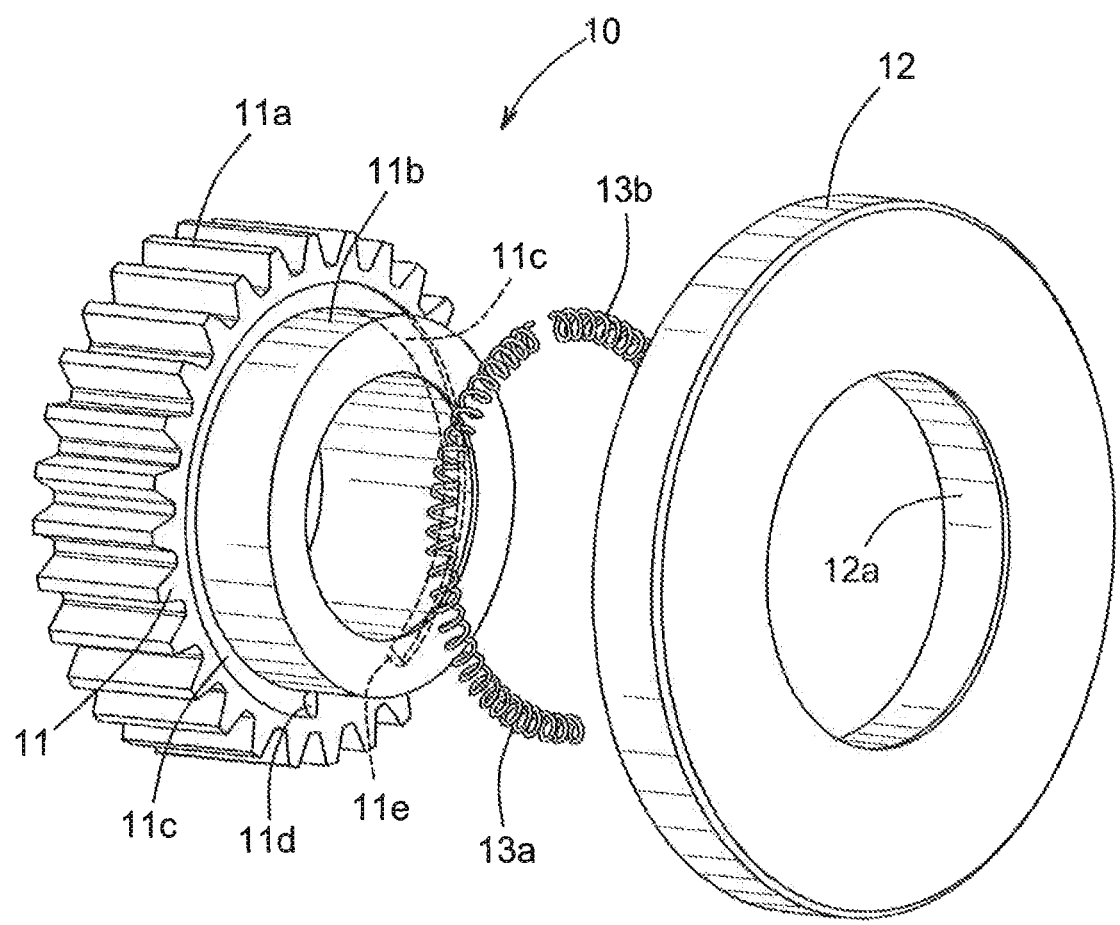
FIG. 3 is an exploded perspective view, taken from a second side, of the first embodiment of the integrated gear and torsional vibration damper assembly illustrated in FIGS. 1 and 2.

The illustrated gear 11 is a spur gear that includes a toothed portion 11a and a hub portion 11b. The illustrated toothed portion 11a of the gear 11 is generally hollow and cylindrical in shape and includes an outer circumferential surface having a plurality of axially extending teeth provided thereon. However, the toothed portion 11a of the gear 11 may have any desired shape and may include teeth provided at any desired location and extending in any desired direction. The illustrated hub portion 11b of the gear 11 is generally hollow and cylindrical in shape and extends co-axially from an axially-facing surface of the toothed portion 11a. The hub portion 11b includes an outer circumferential support surface that, in the illustrated embodiment, is cylindrical in shape. However, the hub portion 11b of the gear 11 may have any desired shape. As best shown in FIG. 3, the gear 11 further includes an annular recess 11c that, in the illustrated embodiment, extends into the axially-facing surface of the toothed portion 11a, adjacent to the outer circumferential support surface of the hub portion 11b. However, the annular recess 11c may be provided at any desired location on the gear 11. A first end of the annular recess 11c defines a first reaction surface 11d, and a second end of the annular recess 11c defines a second reaction surface 11e. The purposes of the annular recess 11c, the first reaction surface 11d, and the second reaction surface 11e will be explained below.

Figure 2:
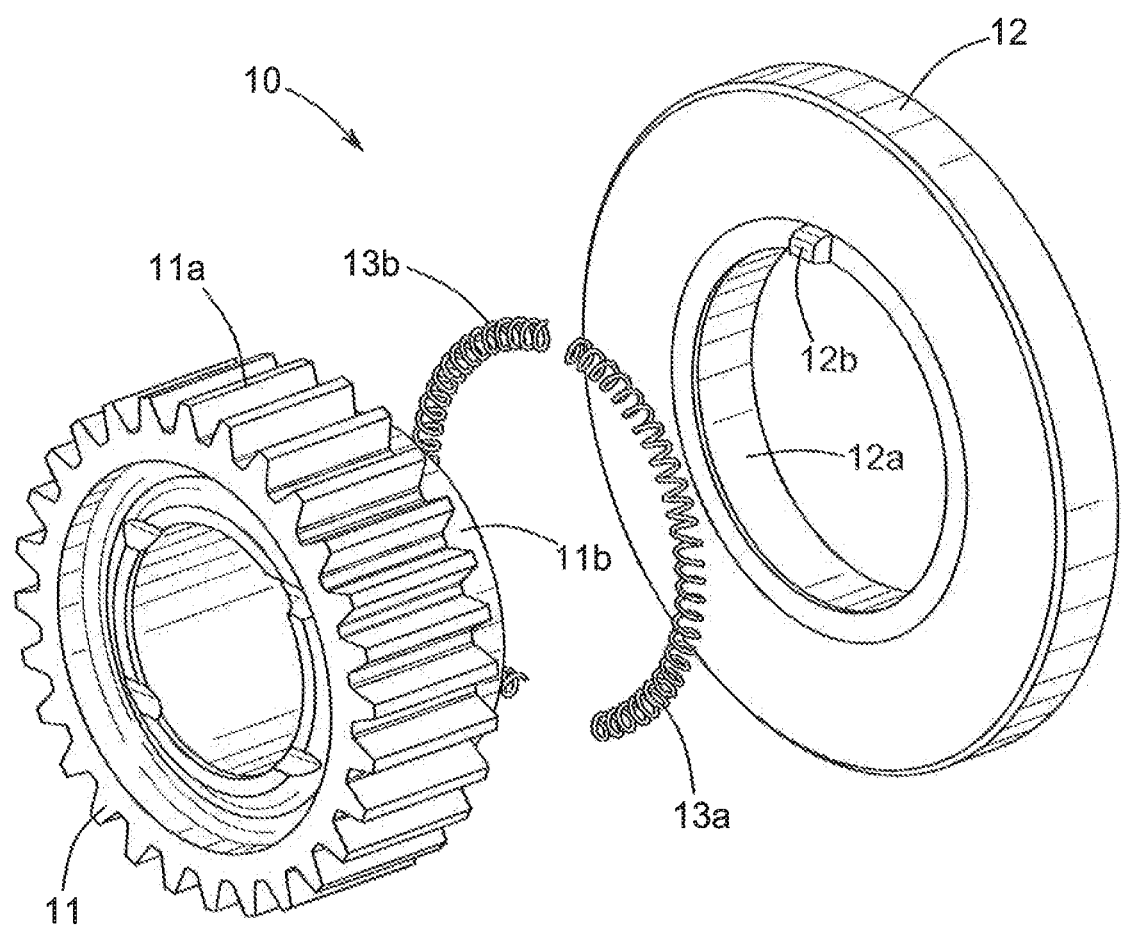
FIG. 2 is an exploded perspective view, taken from a first side, of the first embodiment of the integrated gear and torsional vibration damper assembly illustrated in FIG. 1.

The illustrated torsional vibration damper 12 of the first embodiment of the integrated gear and torsional vibration damper assembly 10 is generally hollow and cylindrical in shape and includes a cylindrical inner circumferential surface 12a. As best shown in FIG. 2, the torsional vibration damper 12 further includes a spring support 12b that, in the illustrated embodiment, extends axially from an axially-facing surface of the torsional vibration damper 12, adjacent to the inner circumferential surface 12a. However, the spring support 12b may extend from any desired location of, and in any desired direction from, the torsional vibration damper 12. The purpose of the spring support 12b will also be explained below.

As best shown in FIGS. 1, 4, 5, and 6, the first embodiment of the integrated gear and torsional vibration damper assembly 10 is assembled by moving the gear 11 and the torsional vibration damper 12 axially toward one another such that the inner circumferential surface 12a of the torsional vibration damper 12 is disposed about and is rotatably supported on the outer circumferential support surface of the hub portion 11b of the gear 11. As a result, the gear 11 and the torsional vibration damper 12 are co-axially supported upon each other for relative rotational movement.

When the gear 11 and the torsional vibration damper 12 are co-axially supported upon each other, the spring support 12b provided on the torsional vibration damper 12 extends axially into the annular recess 11c provided on the axially-facing surface of the gear 11. The spring support 12b provided on the torsional vibration damper 12 is thus located between, and is preferably circumferentially aligned with, both the first reaction surface 11d (defined by the first end of the annular recess 11c) and the second reaction surface 11e (defined by the second end of the annular recess 11c), although such is not required.

First and second springs 13a and 13b are provided for damping relative rotational movement between the gear 11 and the torsional vibration damper 12 of the first embodiment of the integrated gear and torsional vibration damper assembly 10. The first spring 13a is disposed in a first portion of the annular recess 11c and extends from a first end that abuts the first reaction surface 11d defined by the first end of the annular recess 11c to a second end that abuts a first side of the spring support 12b of the torsional vibration damper 12. Similarly, the second spring 13b extends from a first end that abuts the second reaction surface 11e defined by the second end of the annular recess 11c to a second end that abuts a second side of the spring support 12b of the torsional vibration damper 12. In the illustrated embodiment, each of the first and second springs 13a and 13b is a coiled spring. However, the first and second springs 13a and 13b may be embodied as any desired resilient structure or combination of resilient structures.

The first and second springs 13a and 13b provide a resilient rotational driving connection between the gear 11 and the torsional vibration damper 12 of the first embodiment of the integrated gear and torsional vibration damper assembly 10. Prior to operation, the first embodiment of the integrated gear and torsional vibration damper assembly 10 may be mounted on a shaft (not shown) or otherwise supported for meshing engagement with one or more gears (not shown) provided in a gear train in order to reduce the magnitude of torsional vibrations therein or transmitted therethrough.

Figure 4:
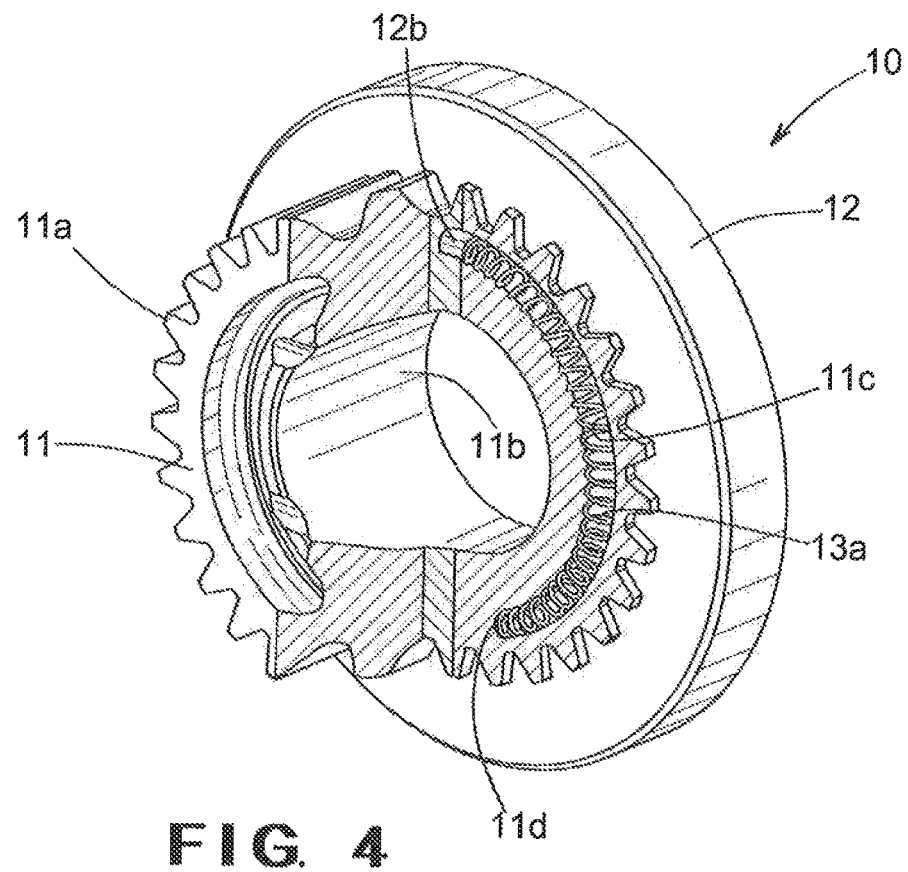
FIG. 4 is an assembled perspective view, partially broken away, showing the first embodiment of the integrated gear and torsional vibration damper assembly in a first stage of operation.
Figure 5:
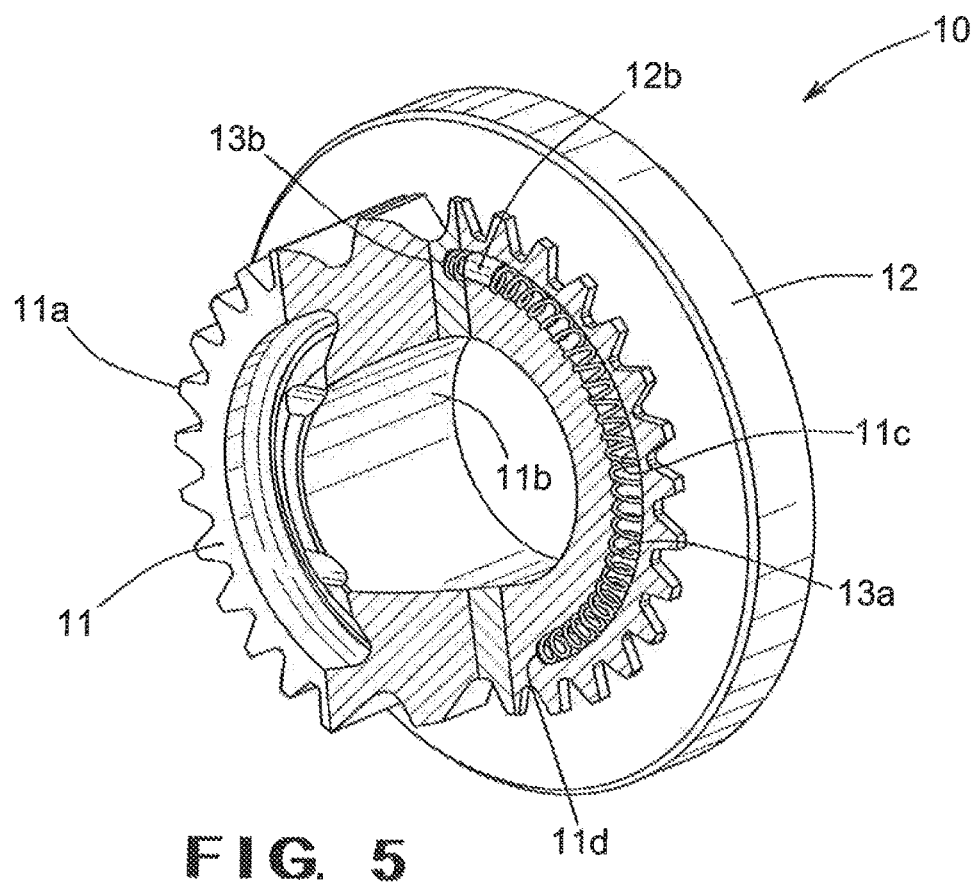
FIG. 5 is an assembled perspective view, partially broken away, showing the first embodiment of the integrated gear and torsional vibration damper assembly in a second stage of operation.
Figure 6:
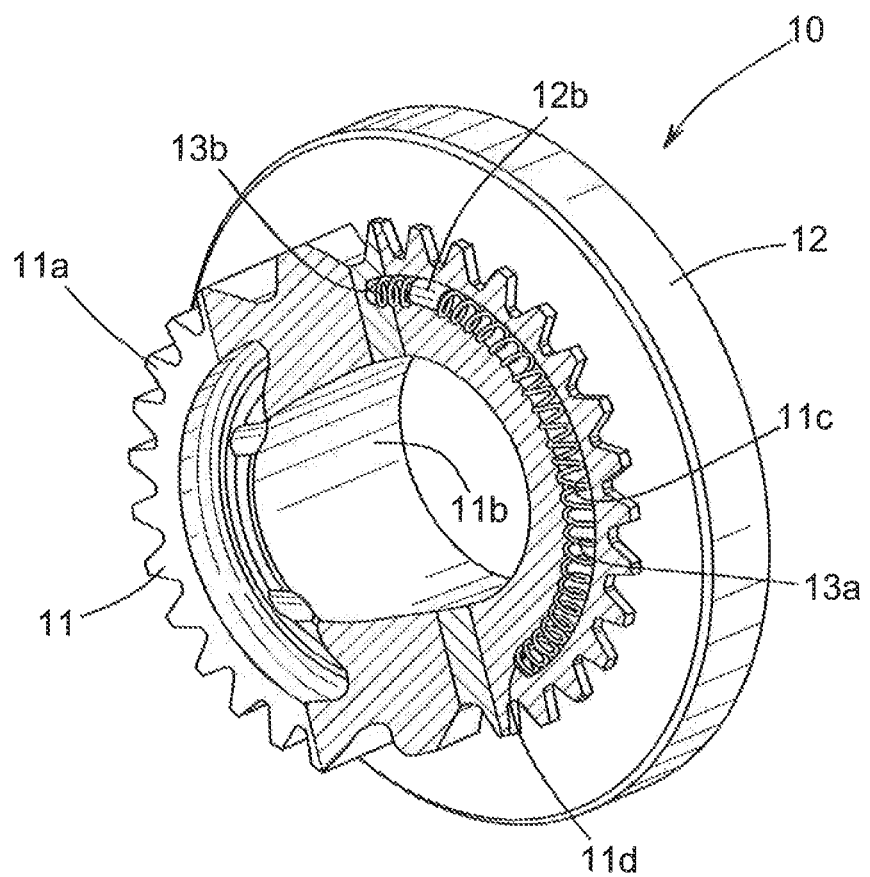
FIG. 6 is an assembled perspective view, partially broken away, showing the first embodiment of the integrated gear and torsional vibration damper assembly in a third stage of operation.

FIGS. 4, 5, and 6 schematically illustrate how the first embodiment of the integrated gear and torsional vibration damper assembly 10 operates during use. FIG. 4 shows the relative orientation of the gear 11 and the torsional vibration damper 12 when the first embodiment of the integrated gear and torsional vibration damper assembly 10 is not subjected to an appreciable magnitude (or an appreciable change in the magnitude) of torque that is either applied to or otherwise transmitted through the gear 11. In this condition, the first and second springs 13a and 13b urge the gear 11 and the torsional vibration damper 12 toward a circumferentially intermediate or neutral position relative to one another, as shown in FIG. 4.

However, when the gear 11 of the first embodiment of the integrated gear and torsional vibration damper assembly 10 is subjected to one or more torsional impulses (such as the torsional vibrations generated by an internal combustion engine or a diesel engine, as described above) of an appreciable magnitude in a first circumferential direction, the gear 11 will initially begin to rotate relative to the torsional vibration damper 12 (as shown in FIG. 5) against the urging of the first spring 13a. Such relative rotational movement between the gear 11 and the torsional vibration damper 12 will continue (as shown in FIG. 6) until the magnitude of the force developed by the increasingly-compressed first spring 13a equals the magnitude of the fluctuation in torque applied to the gear 11. When the torsional impulses applied to the gear 11 are subsequently removed, the gear 11 will then rotate relative to the torsional vibration damper 12 back to original circumferentially intermediate or neutral position shown in FIG. 4. The same sequence of events will occur when the gear 11 of the first embodiment of the integrated gear and torsional vibration damper assembly 10 is subjected to torsional impulses in a second, opposite circumferential direction, except that the second spring 13b will be compressed.

In this manner, the inertia of the torsional vibration damper 12 functions to resist fluctuations in the rotational speed of the entire first embodiment of the integrated gear and torsional vibration damper assembly 10. The total amount of relative rotational movement between the gear 11 and the torsional vibration damper 12 can be limited either by fixed stops or by a limit in travel in the first and second springs 13a and 13b or other resilient material. Torsional vibrations generated by the engine will be largely absorbed by the first and second springs 13a and 13b or other resilient material, thus reducing tooth-to-tooth impact energy that could generate undesirable noise and/or be passed on down the gear train. The first embodiment of the integrated gear and torsional vibration damper assembly 10 can be used in a power take off (not shown) or any other gear train system.

Figure 7:
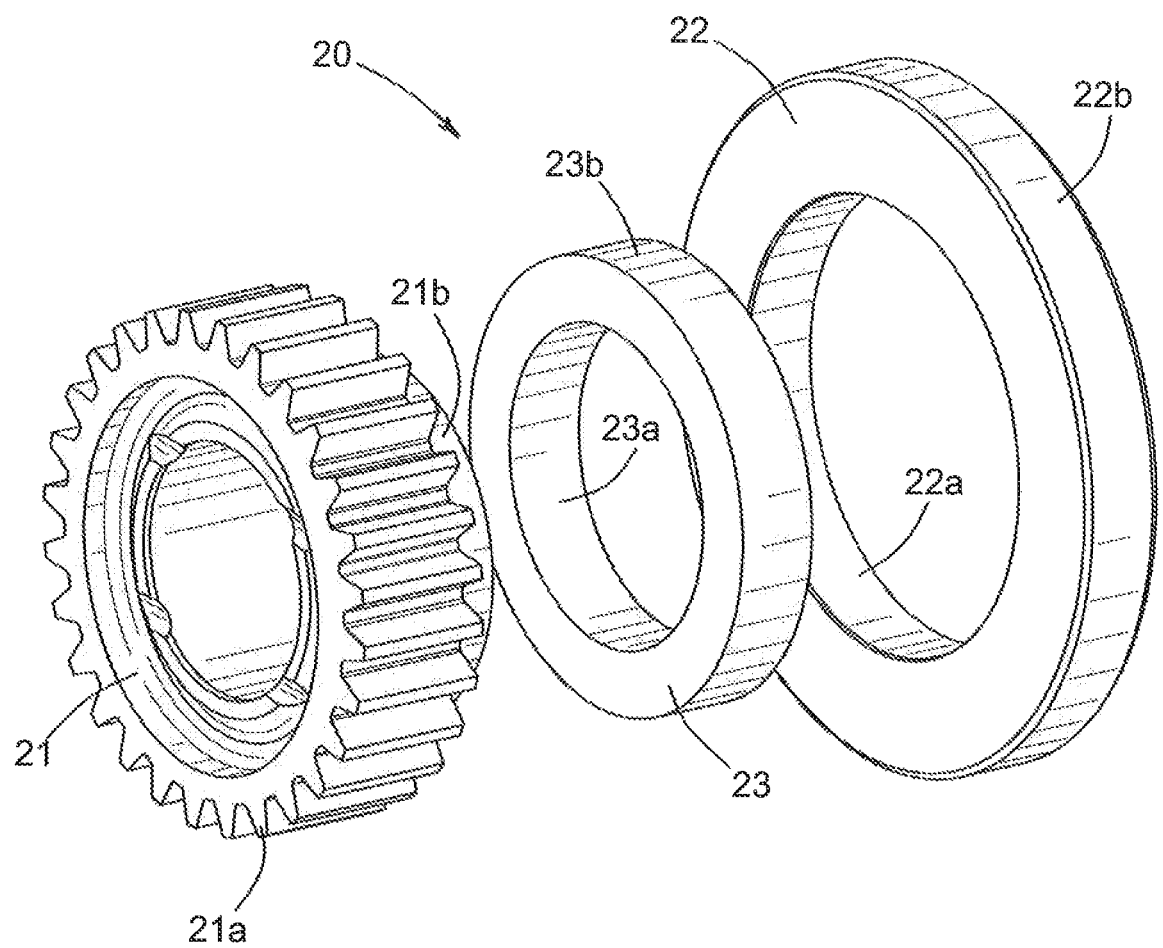
FIG. 7 is an exploded perspective view, taken from a first side, of a second embodiment of an integrated gear and torsional vibration damper assembly in accordance with this invention.

FIG. 7 is an exploded perspective view, taken from a first side, of a second embodiment of an integrated gear and torsional vibration damper assembly, indicated generally at 20, in accordance with this invention. As shown therein, the second embodiment of the integrated gear and torsional vibration damper assembly 20 includes a gear 21 and a torsional vibration damper 22 that, as will be described below, are supported on one another for limited rotational and dampened movement relative to each other by means of an intermediate ring 23.

The illustrated gear 21 is a spur gear that includes a toothed portion 21a and a hub portion 21b. The illustrated toothed portion 21a of the gear 21 is generally hollow and cylindrical in shape and includes an outer circumferential surface having a plurality of axially extending teeth provided thereon. However, the toothed portion 21a of the gear 21 may have any desired shape and may include teeth provided at any desired location and extending in any desired direction. The illustrated hub portion 21b of the gear 21 is generally hollow and cylindrical in shape and extends co-axially from an axially-facing surface of the toothed portion 21a. The hub portion 21b includes an outer circumferential support surface that, in the illustrated embodiment, is cylindrical in shape. However, the hub portion 21b of the gear 21 may have any desired shape. The illustrated torsional vibration damper 22 of the second embodiment of the integrated gear and torsional vibration damper assembly 20 is generally hollow and cylindrical in shape and includes an inner circumferential surface 22a. However, the torsional vibration damper 22 may have any desired shape.

The illustrated intermediate ring 23 is generally hollow and cylindrical in shape and includes an inner circumferential surface 23a and an outer circumferential surface 23b. The inner circumferential surface 23a of the intermediate ring 23 is disposed about and supported on the outer circumferential support surface of the hub portion 21b of the gear 21. The intermediate ring 23 may be retained on and secured to the hub portion 21b of the gear 21 in any desired manner, such as by friction, mechanical engagement, adhesive, and the like. Similarly, the inner circumferential surface 22a of the torsional vibration damper 22 is disposed about and supported on the outer circumferential surface 23b of the intermediate ring 23. The torsional vibration damper 22 may be retained on and secured to the intermediate ring 23 in any desired manner, such as by friction, mechanical engagement, adhesive, and the like. The intermediate ring 23 is preferably formed from a resilient material, such as an elastomeric material.

When the gear 21 of the second embodiment of the integrated gear and torsional vibration damper assembly 20 is subjected to one or more torsional impulses (such as the torsional vibrations generated by an internal combustion engine or a diesel engine, as described above) of an appreciable magnitude in a first circumferential direction, the gear 21 will initially begin to rotate relative to the torsional vibration damper 22 because of the resiliency of the intermediate ring 23 extending therebetween. Such relative rotational movement between the gear 21 and the torsional vibration damper 22 will continue until the magnitude of the force developed by the increasingly torsionally compressed intermediate ring 23 equals the magnitude of the fluctuation in torque applied to the gear 21. When the torsional impulses applied to the gear 21 are removed, the gear 21 will then rotate relative to the torsional vibration damper 22 back to the original circumferentially intermediate or neutral position. The same sequence of events will occur when the gear 21 of the second embodiment of the gear and torsional vibration damper assembly 20 is subjected to torsional impulses in a second, opposite circumferential direction, except that the intermediate ring 23 will be torsionally compressed in the opposite rotational direction. In this manner, the inertia of the torsional vibration damper 22 functions to resist fluctuations in the rotational speed of the entire second embodiment of the integrated gear and torsional vibration damper assembly 20.

Figure 8:
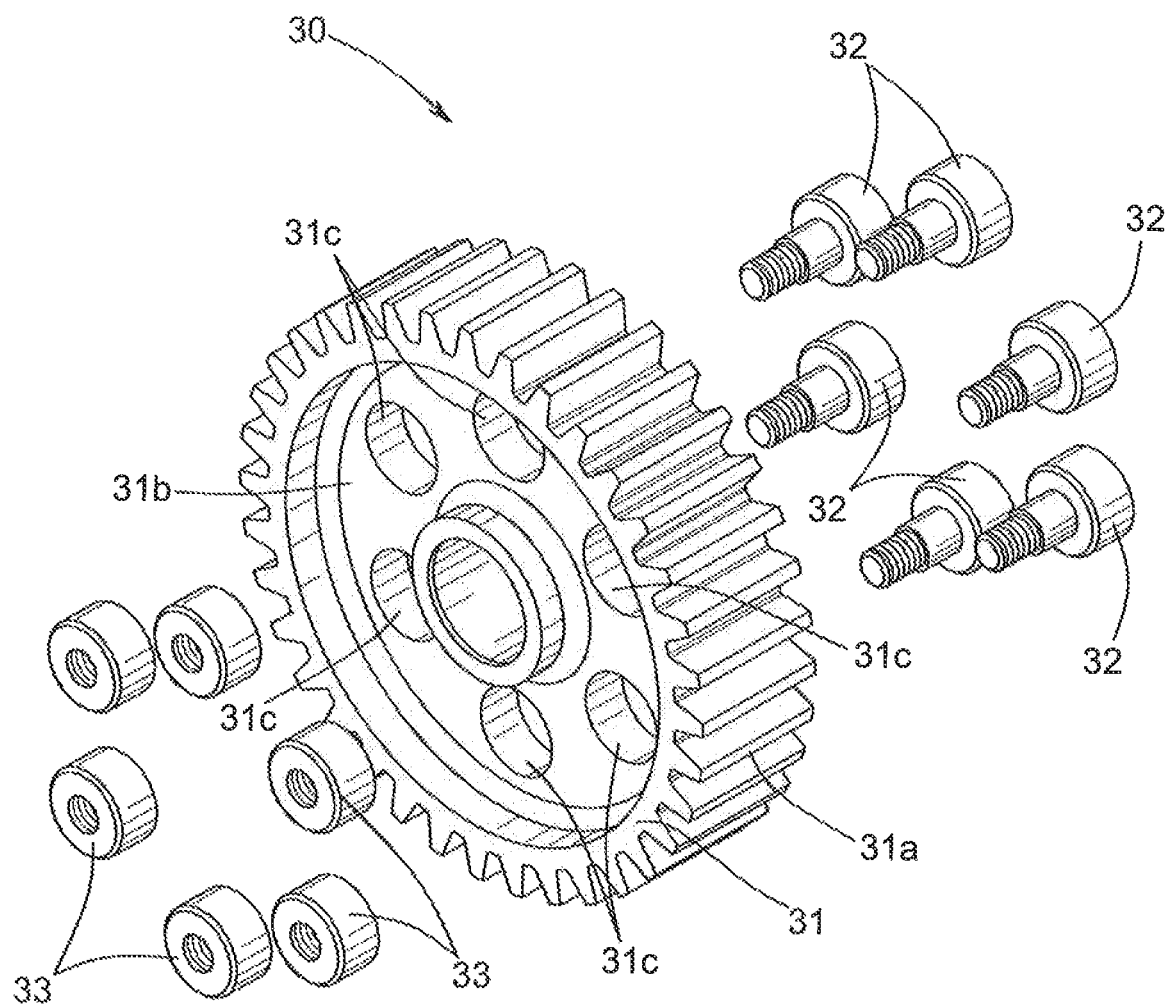
FIG. 8 is an exploded perspective view, taken from a first side, of a third embodiment of an integrated gear and torsional vibration damper assembly in accordance with this invention.

FIG. 8 is an exploded perspective view, taken from a first side, of a third embodiment of an integrated gear and torsional vibration damper assembly, indicated generally at 30, in accordance with this invention. As shown therein, the third embodiment of the integrated gear and torsional vibration damper assembly 30 includes a gear 31 that, in the illustrated body, is a spur gear having a toothed portion 31a and a hub portion 31b. The illustrated toothed portion 31a of the gear 31 is generally hollow and cylindrical in shape and includes an outer circumferential surface having a plurality of axially extending teeth provided thereon. However, the toothed portion 31a of the gear 31 may have any desired shape and may include teeth provided at any desired location and extending in any desired direction.

The illustrated hub portion 31b of the gear 31 is generally disk-shaped and extends radially inwardly from the toothed portion 31a. The hub portion 31b has one or more openings 31c (six in the illustrated embodiment) extending therethrough. A torsional vibration damper 32 extends through each of the openings 31c and is retained therein by a retainer 33. Each of the openings 31c extending through the hub portion 31b of the gear 31 defines an inner dimension that is larger than an outer dimension defined by the portion of the associated torsional vibration damper 32 that extends therethrough. Thus, each of the assemblies of the torsional vibration dampers 32 and the retainers 33 is capable of movement relative to the hub portion 31b of the gear 31. However, the inner dimension defined by each of the openings 31c is smaller than outer dimensions defined by both the end portions of the torsional vibration dampers 32 and the retainers 33. Thus, each of the assemblies of the torsional vibration dampers 32 and the retainers 33 is positively retained within the associated openings 31c, but is capable of movement relative thereto.

Figure 9:
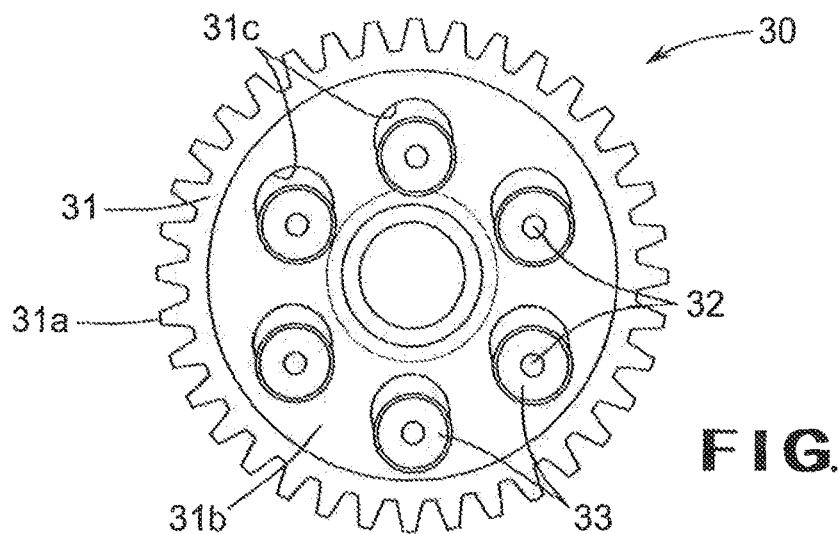
FIG. 9 is an end elevational view showing the third embodiment of the integrated gear and torsional vibration damper assembly in a first stage of operation.
Figure 10:
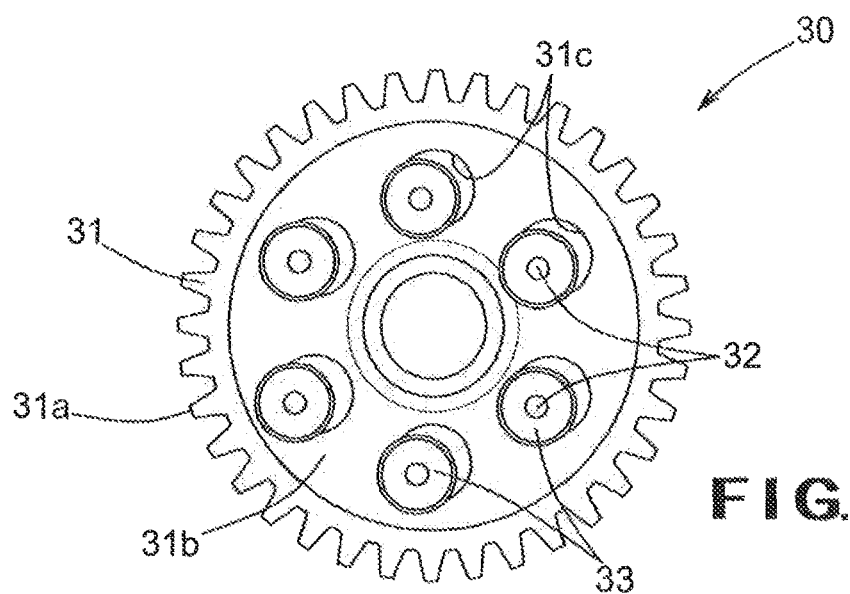
FIG. 10 is an end elevational view showing the third embodiment of the integrated gear and torsional vibration damper assembly in a second stage of operation.
Figure 11:
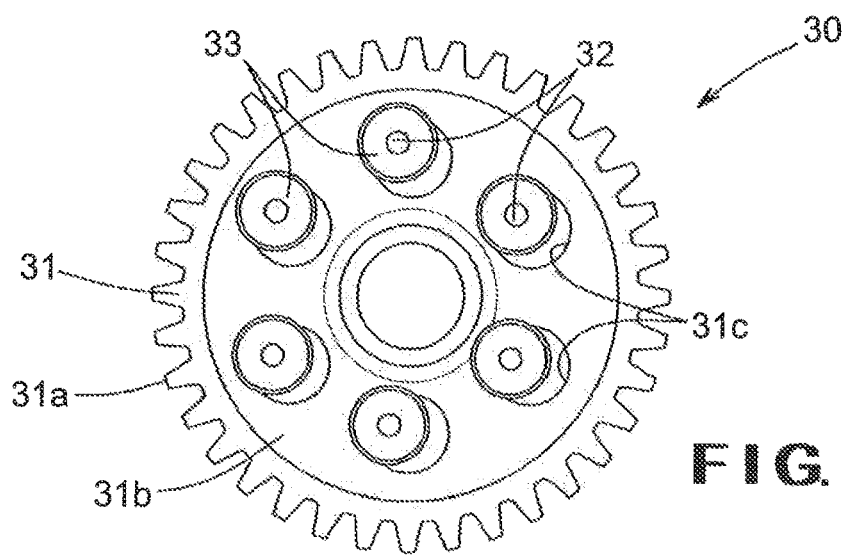
FIG. 11 is an end elevational view showing the third embodiment of the integrated gear and torsional vibration damper assembly in a third stage of operation.
Figure 12:
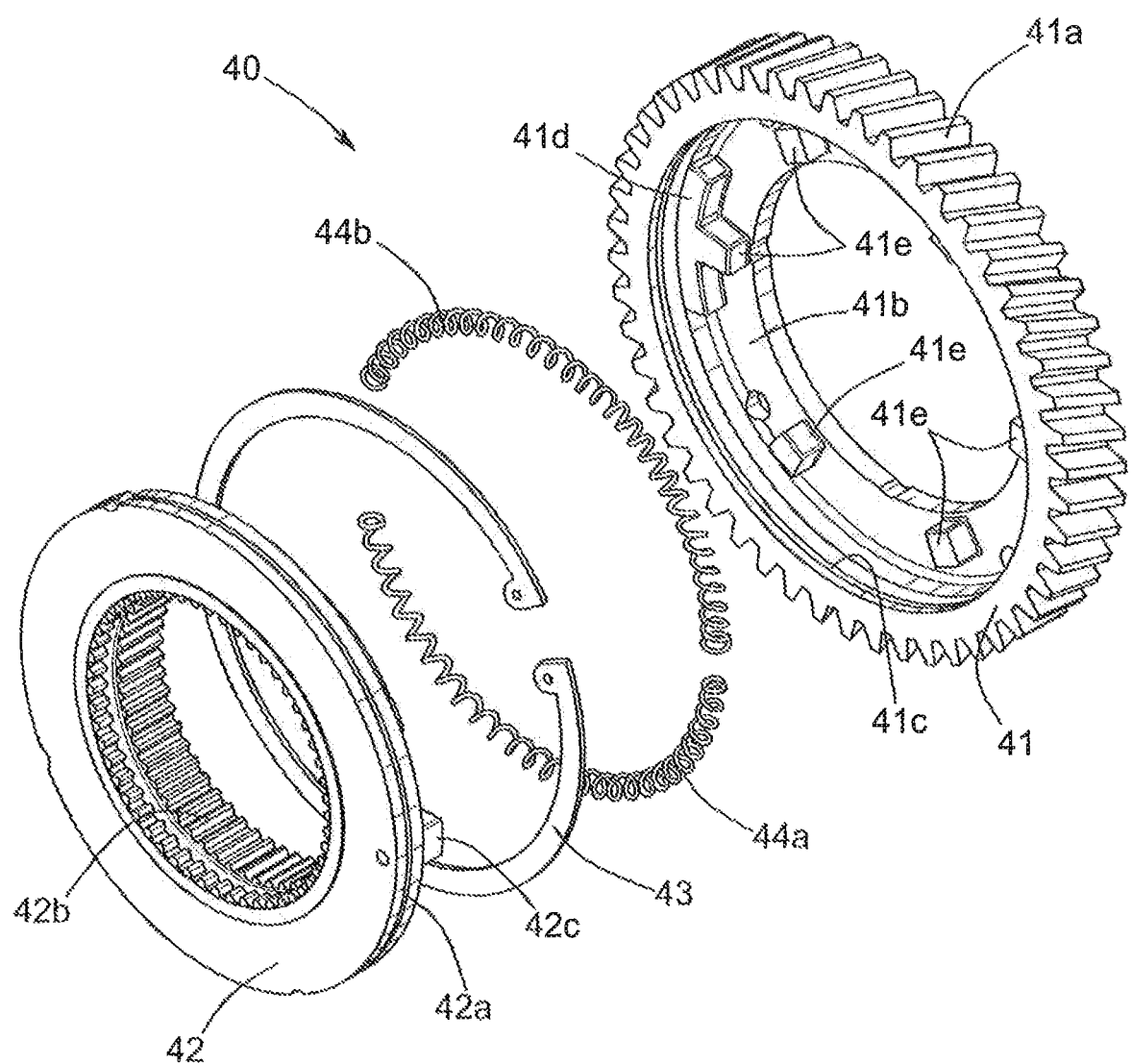
FIG. 12 is an exploded perspective view, taken from a first side, of a fourth embodiment of an integrated gear and torsional vibration damper assembly in accordance with this invention.
Figures 13, 14:
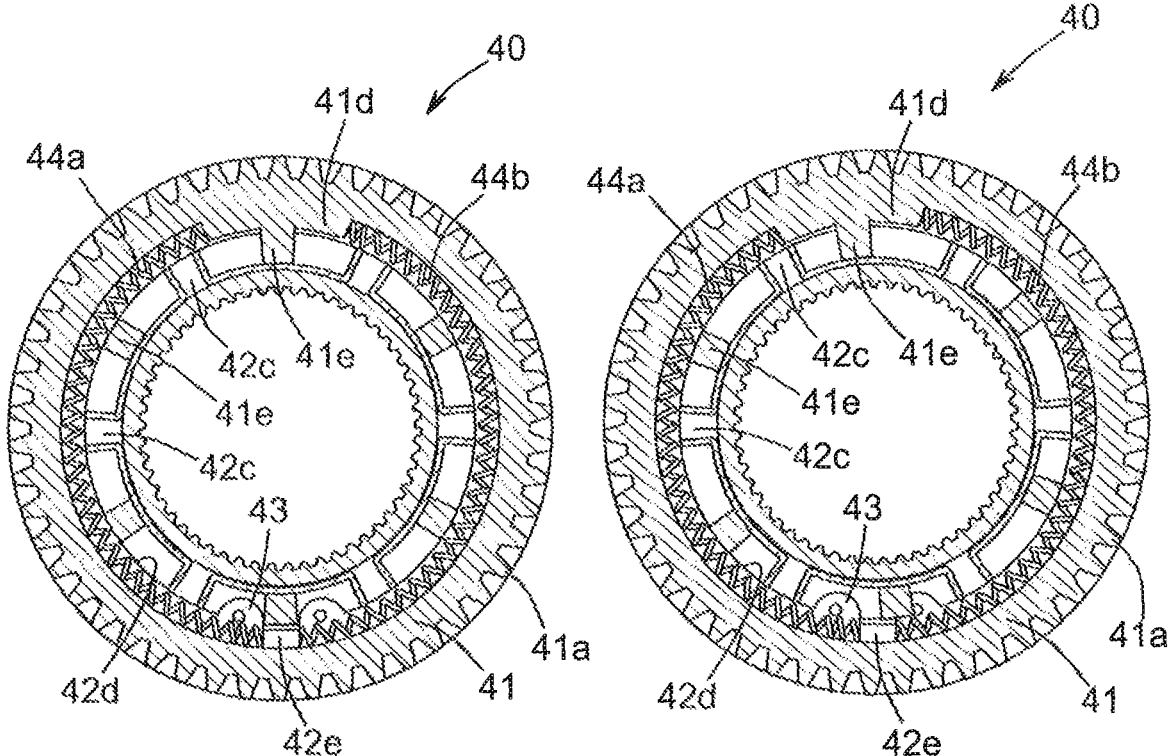
FIG. 13 is an end elevational view showing the fourth embodiment of the integrated gear and torsional vibration damper assembly in a first stage of operation.
FIG. 14 is an end elevational view showing the fourth embodiment of the integrated gear and torsional vibration damper assembly in a second stage of operation.
Figures 15, 16:
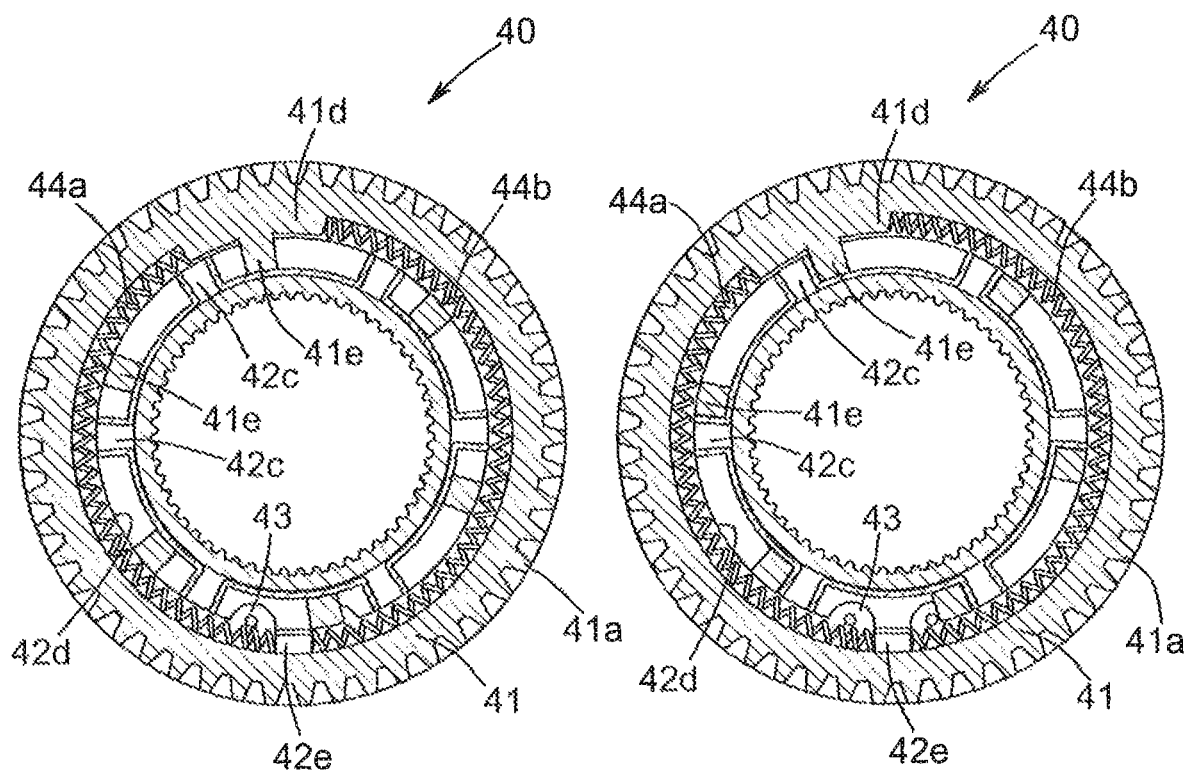
FIG. 15 is an end elevational view showing the fourth embodiment of the integrated gear and torsional vibration damper assembly in a third stage of operation.
FIG. 16 is an end elevational view showing the fourth embodiment of the integrated gear and torsional vibration damper assembly in a fourth stage of operation.

FIGS. 9, 10, and 11 illustrate how the third embodiment of the integrated gear and torsional vibration damper assembly 30 functions. FIG. 9 shows the third embodiment of the integrated gear and torsional vibration damper assembly 30 in a neutral position, i.e., when no torque being transmitted therethrough. When the gear 31 of the third embodiment of the integrated gear and torsional vibration damper assembly 30 is subjected to one or more torsional impulses (such as the torsional vibrations generated by an internal combustion engine or a diesel engine, as described above) of an appreciable magnitude in a first circumferential direction, the gear 31 will initially begin to rotate relative to each of the assemblies of the torsional vibration dampers 32 and the retainers 33 because of inertia. When the torsional impulses applied to the gear 31 are removed, the gear 31 will then rotate relative to each of the assemblies of the torsional vibration dampers 32 and the retainers 33 back to original circumferentially intermediate or neutral position. The same sequence of events will occur when the gear 31 of the third embodiment of the integrated gear and torsional vibration damper assembly 30 is subjected to torsional impulses in a second, opposite circumferential direction, except that the assemblies of the torsional vibration dampers 32 and the retainers 33 will move relative to the gear 31 in the opposite direction. In this manner, the inertia of each of the assemblies of the torsional vibration dampers 32 and retainers 33 functions to resist fluctuations in the rotational speed of the entire third embodiment of the integrated gear and torsional vibration damper assembly 30.

Referring now to FIGS. 12 through 16, there is illustrated a fourth embodiment of an integrated gear and torsional vibration damper assembly, indicated generally at 40, in accordance with this invention. As shown therein, the fourth embodiment of the integrated gear and torsional vibration damper assembly 40 includes a gear 41 and a torsional vibration damper 42 that, as will be described below, are supported on one another for limited rotational and dampened movement relative to each other.

The illustrated gear 41 is a spur gear that includes a toothed portion 41a and a body portion 41b. The illustrated toothed portion 41a of the gear 41 is generally hollow and cylindrical in shape and includes an outer circumferential surface and an inner circumferential surface. The outer circumferential surface of the toothed portion 41a has a plurality of helically extending teeth provided thereon. However, the toothed portion 41a of the gear 41 may have any desired shape and may include teeth provided at any desired location and extending in any desired direction. The inner circumferential surface of the toothed portion 41a is generally cylindrical in shape and has an annular groove 41c provided therein. The purpose of this annular groove 41c will be explained below.

The illustrated body portion 41b of the gear 41 is generally disk-shaped and extends radially inwardly from the toothed portion 41a. The body portion 41b includes a spring support 41d that, in the illustrated embodiment, extends axially from an axially-facing surface of the body portion 41b of the gear 41. However, the spring support 41d may extend from any desired location of, and in any desired direction from, the body portion 41b of the gear 41. The illustrated body portion 41b of the gear 41 also includes a plurality of rotational stops 41e that, the illustrated embodiment, extend from the axially-facing surface of the body portion 41b of the gear 41. However, the rotational stops 41e may extend from any desired location of, and in any desired direction from, the body portion 41b of the gear 41. The purposes of the spring support 41d and the rotational stops 41e will be explained below.

The illustrated torsional vibration damper 42 is generally hollow and cylindrical in shape and includes an outer circumferential surface and an inner circumferential surface. The outer circumferential surface of the torsional vibration damper 42 is generally cylindrical in shape and has an annular groove 42a provided therein. The inner circumferential surface of the torsional vibration damper 42 is also generally cylindrical in shape and has a plurality of splines 42b provided thereon. The illustrated torsional vibration damper 42 also includes a plurality of rotational stops 42c that, in the illustrated embodiment, extend from the axially-facing surface of the torsional vibration damper 42. However, the rotational stops 42c may extend from any desired location of, and in any desired direction from, the torsional vibration damper 42. The purposes of the annular groove 42a, the splines 42b, and the rotational stops 42c will be explained below.

The torsional vibration damper 42 also includes an annular recess 42d that, in the illustrated embodiment, extends into an axially-facing surface thereof, adjacent to the outer circumferential surface of the torsional vibration damper 42. However, the annular recess 42d may be provided at any desired location on the torsional vibration damper 42. The torsional vibration damper 42 further includes a spring support 42e that, in the illustrated embodiment, extends from an axially-facing surface of the torsional vibration damper 42 within the recess 42d. However, the spring support 42e may extend from any desired location of, and in desired direction from, the torsional vibration damper 42. The purposes of the annular recess 42d and the spring support 42e will also be explained below.

The fourth embodiment of the integrated gear and torsional vibration damper assembly 40 is assembled by moving the gear 41 and the torsional vibration damper 42 axially toward one another such that the inner circumferential surface of the gear 41 is disposed about and rotatably supported on the outer circumferential surface of the torsional vibration damper 42. Such axial movement of the gear 41 and the torsional vibration damper 42 is continued until the annular groove 41c provided in the inner circumferential surface of the toothed portion 41a of the gear 41 is aligned with the annular groove 42a provided in the outer circumferential surface of the torsional vibration damper 42. A locking ring 43 is provided to retain the gear 41 and the torsional vibration damper 42 in this assembled orientation. To accomplish this, portions of the locking ring 43 extend into both the annular groove 41c provided in the inner circumferential surface of the toothed portion 41a of the gear 41 and the annular groove 42a provided in the outer circumferential surface of the torsional vibration damper 42. When the gear 41 and the torsional vibration damper 42 are co-axially supported upon each other in this manner, the spring support 41d provided on the gear 41 extends axially into the annular recess 42d provided on the axially-facing surface of the torsional vibration damper 42.

First and second springs 44a and 44b are provided for damping relative rotational movement between the gear 41 and the torsional vibration damper 42 of the fourth embodiment of the integrated gear and torsional vibration damper assembly 40. The first spring 44a is disposed in a first portion of the annular recess 42d and extends from a first end that abuts a first side of the spring support 41d provided on the gear 41 to a second end that abuts a first side of the spring support 42e provided on the torsional vibration damper 42. Similarly, the second spring 44b is disposed in a second portion of the annular recess 42d and extends from a first end that abuts a second side of the spring support 41d provided on the gear 41 to a second end that abuts a second side of the spring support 42e provided on the torsional vibration damper 42. In a manner that is similar to that described above, the first and second springs 44a and 44b provide a resilient rotational driving connection between the gear 41 and the hub 42 of the fourth embodiment of the integrated gear and torsional vibration damper assembly 40.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An integrated gear and torsional vibration damper assembly comprising:
    a gear having a toothed portion; and
    a torsional vibration damper supported on the gear for limited rotational and dampened movement relative to each other, wherein:
        the gear has a recess that is provided in an axially facing surface thereof and that includes a reaction surface,
        the torsional vibration damper includes a spring support that extends axially into the recess, and
        a spring extends between the reaction surface and the spring support.

2. The integrated gear and torsional vibration damper assembly defined in claim 1 wherein the gear includes a hub portion, and the torsional vibration damper is supported on the hub portion of the gear.

3. The integrated gear and torsional vibration damper assembly defined in claim 1 wherein:
    the reaction surface is a first reaction surface,
    the recess includes a second reaction surface,
    wherein the spring comprises a first spring extending between the first reaction surface and the spring support, and
    a second spring extending between the second reaction surface and the spring support.

4. An integrated gear and torsional vibration damper assembly comprising:
    a gear having a toothed portion; and
    a torsional vibration damper supported on the gear for limited rotational and dampened movement relative to each other, the torsional vibration damper including first and second end portions, wherein:
        the gear includes a toothed portion and a hub portion that extends radially inwardly from the toothed portion and has an opening extending therethrough, and
        the torsional vibration damper extends through the opening, wherein an inner dimension defined by the opening is smaller than outer dimensions defined by the first and second end portions of the torsional vibration damper and larger than an outer dimension defined by a portion of the torsional vibration damper that extends therethrough from the first end portion to the second end portion.

5. The integrated gear and torsional vibration damper assembly defined in claim 4 wherein the hub portion has a plurality of openings extending therethrough, and wherein a plurality of the torsional vibration dampers extend respectively through the plurality of openings.

6. The integrated gear and torsional vibration damper assembly defined in claim 5 wherein each of the openings defines an inner dimension that is larger than an outer dimension defined by each of the torsional vibration dampers that extend therethrough.

7. An integrated gear and torsional vibration damper assembly comprising:
    a gear having a toothed portion and including an inner circumferential surface; and
    a torsional vibration damper including an outer circumferential surface that is supported on the inner circumferential surface of the gear for limited rotational and dampened movement relative to each other, wherein:
        the inner circumferential surface of the gear has a groove,
        the outer circumferential surface of the torsional vibration damper has a groove, and
        a locking ring extends into both grooves to retain the gear and torsional vibration damper together.

8. The integrated gear and torsional vibration damper assembly defined in claim 7 wherein the gear includes a spring support, the torsional vibration damper includes a spring support, and a spring extends between the spring support of the gear and the spring support of the torsional vibration damper.

9. The integrated gear and torsional vibration damper assembly defined in claim 7 wherein the gear includes a spring support, the torsional vibration damper includes a spring support, a first spring extends between a first side of the spring support of the gear and a first side of the spring support of the torsional vibration damper, and a second spring extends between a second side of the spring support of the gear and a second side of the spring support of the torsional vibration damper.

* * * * *